Patented Dec. 10, 1940

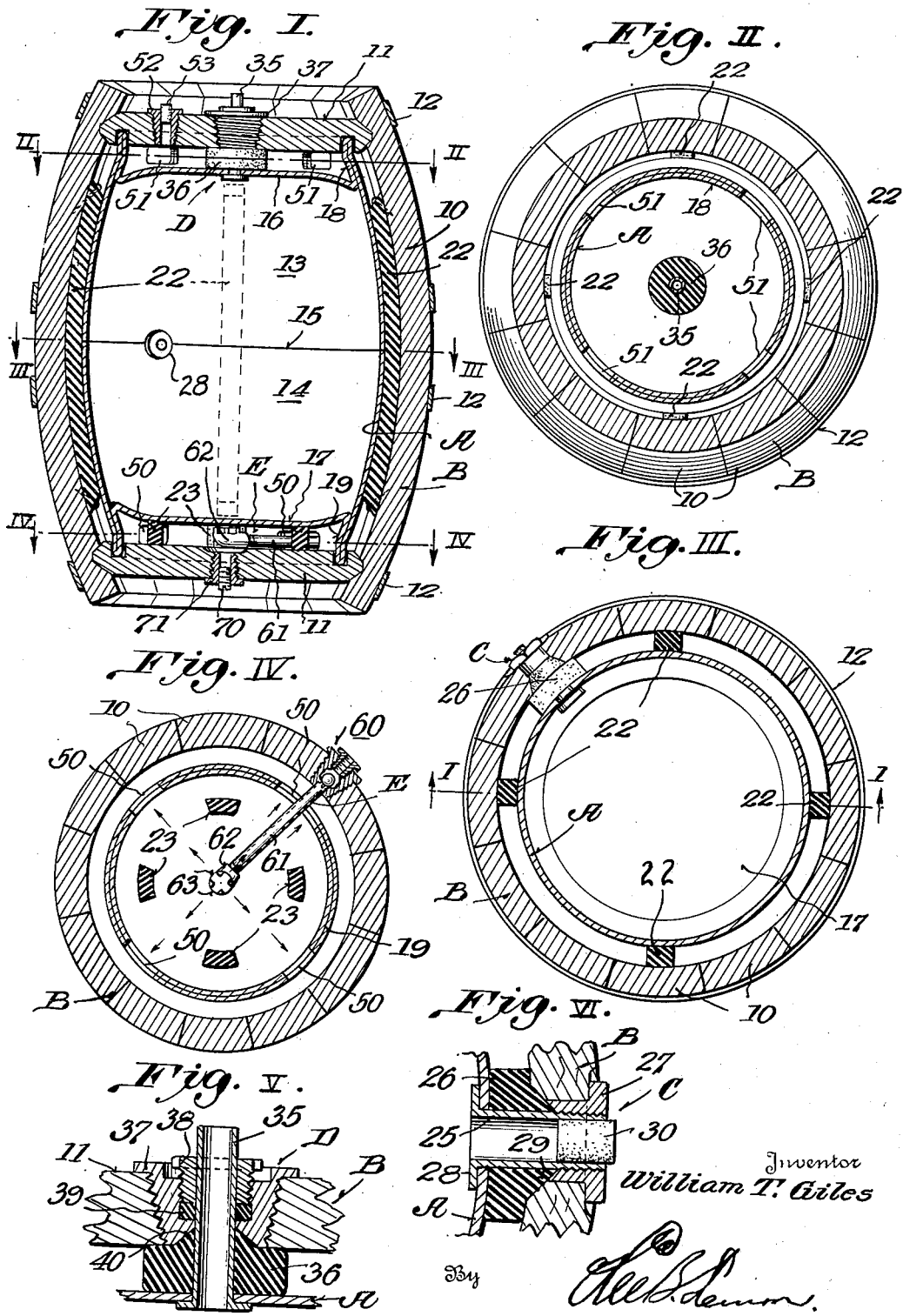

2,224,632

UNITED STATES PATENT OFFICE 2,224,632

CONTAINER

William T. Giles, Shamokin, Pa., assignor of one-half to Philip H. Fuhrmann, Shamokin, Pa.

Application May 19, 1939, Serial No. 274,639

5 Claims. (Cl. 257—14)

This invention relates to containers, and more particularly to barrel constructions for use in transporting, storing and cooling beer or other beverages. The present invention is especially useful in the brewery trade, but may obviously be practiced in other arts which present problems that are solved by this disclosure.

Heretofore, the barrels or portable containers available for handling beer in bulk have been of a number of different types. Perhaps the best known of these is the conventional wooden keg having staves and heads held in assembled relation by hoops. This prior art wooden keg has no cooling device forming a part thereof, although it is sometimes provided with cooling coils for the keg interior as shown in the Schulse patent, 2,051,013 of 1936. There are also the all-metal types of beer kegs or barrels. One form of metallic beer keg has single walls and no cooling means. Another type of metallic beer keg has double walls to provide space for a cooling medium, an example of such construction being found in the patent to Lee, 2,116,795 of 1938.

Each conventional type of beer keg or barrel presents special problems and definite objectionable features which the present invention overcomes.

Conventional wooden barrels shrink as they age, and have their capacity for holding beer altered in accordance with this shrinkage. Tap room keepers have learned of this objection and are now demanding metallic kegs so that they will be more apt to receive maximum quantity in each beer keg.

The current type of beer spigot being used in tap rooms presents another problem for the beer keg manufacturer. This beer spigot requires as high as 50 lbs. pressure on the stored beer to get the desired head on a glass of beer. These high pressures have heretofore required the use of metallic kegs in place of wooden kegs, since such pressures open the joints of wooden kegs and cause them to leak.

Conventional all-metal kegs, however, are open to the objection that they "sweat" or condense moisture on their outer surfaces. This moisture will collect about the kegs in untidy and messy pools. Furthermore, all-metal kegs are not as easy to inspect and clean as conventional wooden barrels, since the latter, but not the former, are readily taken apart and assembled at will. It is moreover the fact that inexpensive all-metal kegs are easily dented and for such reason not as satisfactory as wooden kegs of comparable cost in manufacture.

Another long standing problem in the brewery trade has been the satisfactory cooling of beer stored in kegs. Since the thick walls of conventional wooden kegs are good heat insulators, it has heretofore been difficult to cool beer after it is placed in the keg, except as coils, such as shown in Figure 3 of the above-noted Schulse patent, are provided. The practice of placing cooling coils in a beer barrel is attended by certain disadvantages. The cooling process is relatively slow, and the cooling must proceed for a substantial period of time before the contents of a full keg of beer are completely chilled to a low temperature. With cooling coils, there is a tendency toward lack of uniform cooling throughout the entire quantity of beer held in the keg. It is also found that where the interior of a keg is provided with cooling coils, the last part of the keg contents to be withdrawn is warm, since it has not been in contact with the coils. The use of cooling coils in the keg, therefore, presents definite objections as explained above.

The use of cooling coils through which the beer is discharged as it comes from a keg is also objectionable. Such cooling coils tend to collect wild yeast or other contaminating material which either spoils or impairs the quality of fresh beer being cooled and dispensed.

Cooling coils are also open to the objection that they are relatively fragile, often leak, frequently become loose at their joints, and are easily clogged.

Another refrigeration problem is presented by conventional all-metal kegs. Such kegs require not only refrigeration to cool the beer but also additional refrigeration to offset the losses due to rapid heat transfer from the atmosphere through the metallic outer walls which are good heat conductors.

The present construction combines the advantages of the wooden kegs and metallic kegs and also avoids the above noted objections thereto. In its preferred form, the improved keg avoids loss of beer by leakage through wall joints, is relatively simple but sturdy in construction, is relatively inexpensive to manufacture, insures an invariable capacity for beer, and comprises a structure which may be readily cleaned and inspected when such is desired.

The present invention, furthermore, provides an improved beer cooling keg which eliminates the need for refrigerating coils. Keg constructions embodying this invention provide for quick cooling of the keg contents and make it possible for the keg user to maintain a desired uniform temperature throughout the keg contents and over relatively long periods of time. The instant improvement also provides cooling down to the last drop of beer withdrawn from the keg.

Another feature of this invention resides in an improved flow of cooling medium through a double-walled keg to secure maximum efficiency in heat exchange between the cooling medium and the walls of the inner container.

It is, therefore, one object of this invention to provide an improved and novel form of barrel or keg for transporting, storing, and/or cooling beer or other fluid.

A further object is to provide a keg which permits its contents to be served to the ultimate consumer in the same condition as when it leaves the brewery.

Another object of this invention is to provide a beer cooling keg which permits rapid cooling of the beer and minimizes refrigeration losses due to heat transfer through keg walls.

A further object is to provide a double-walled cooling keg, which is so constructed that the cooling medium passing through the space between the double keg walls will rapidly cool the beer contents to a desired temperature which is substantially uniform throughout the beer.

Still another object is to provide improved filling and tapping devices for kegs, such as those which are used to contain beer.

Other objects and advantages of this invention will be apparent from the following description and claims as well as the accompanying drawing which illustrates a preferred embodiment.

In the drawing, Figure I is a vertical, longitudinal cross-sectional view through a keg or barrel embodying a preferred form of this invention.

Figures II, III and IV are, respectively, cross-section views on lines II—II, III—III and IV—IV of Figure I.

Figures V and VI are enlarged sectional views of details shown in Figure I.

The drawing illustrates a double-walled container, keg, or barrel, comprising inner and outer shells A and B. Both of these shells A and B preferably have similarly shaped bulging side walls, this bulge or bilge being on the order of that in the side walls of conventional wooden beer kegs and barrels. The proportions of these shells A and B are also preferably such that they provide substantially uniform spacing therebetween and at all sides of the inner shell A. This spacing may be on the order of one-half of an inch.

*Outer shell*

The outer shell or barrel member B, except as explained hereinafter, is preferably substantially similar in construction to a conventional wooden beer keg or barrel. The barrel member B is of relatively stout construction to protect the inner shell A during rough handling of the keg. The barrel member B comprises relatively thick arcuately-shaped staves 10, relatively thick heads 11 and stout hoops 12. The staves 10 and heads 11 are preferably formed of wood or other material which is a poor conductor of heat. The staves 10 and heads 11 are fitted together, according to usual practice in the wooden keg art, to provide liquid tight joints and are held in assembled relation by the hoops 12. These hoops 12 are preferably removable so that the barrel member B may be readily taken apart when desired. This construction facilitates replacement of the individual staves 10 and heads 11, as well as inspection and cleaning of the interior of the barrel member B and the exterior of inner shell A.

*The inner shell*

The inner shell A serves as a vessel to hold beer and is preferably formed of material which is a relatively good heat conductor. This material may be metal, such as stainless steel. The inner shell A is also preferably formed by stamping two sheets of metal to form complementary halves 13 and 14 (see Figure I), and welding their edges together to form a liquid tight welded joint 15. The inner shell A and its joints should be capable of withstanding pressures up to 50 lbs., as such pressures are frequently used in the dispensing of barreled beer. As previously stated, the side walls of the inner shell A are outwardly bulged, as shown in Figure I. The inner shell end walls or heads 16 and 17 are preferably also somewhat dished as illustrated in Figure I. In forming the inner shell A, it is preferably provided with ring-shaped flanges 18 and 19 which project from the marginal edges of the end walls 16 and 17, respectively. These ring-shaped flanges 18 and 19 are formed of double thickness or two layers, as shown in Figure I, and during the shaping operation for the two halves of the inner shell A. The flanges 18 and 19 are, therefore, formed integrally and simultaneously with the inner shell side walls and end walls 16 and 17. As a further step, the flanges 18 and 19 may be pinched or rolled to completely avoid the possibility of the inner shell liquid contents flowing around the marginal edges of end walls 16 and 17 and into the interior of the doubled flanges 18 and 19.

The inner shell A may be braced and protected against injury or shock by members 22 and 23, which preferably are secured to the barrel member B but not to the inner shell A. These members 22 and 23 may be in the form of elastic rubber strips having a normal thickness somewhat greater than the distance between the walls of the inner and outer shells A and B. These strips 22 and 23, when installed in place between the inner and outer shells A and B, will, therefore, be somewhat compressed and adapted to not only brace the side and bottom walls of the inner shell or container A, but also absorb shocks which might otherwise be transmitted to the inner shell A when the keg is jarred or bumped by contact with another object.

The strips 22 may be four in number and may be equally spaced about the inner shell A as illustrated in Figure III. Each strip 22 may be secured in suitable manner, as by screws, to the adjacent stave 10 of the barrel member B. The strips 22 also provide a seat for the inner shell A to yieldingly resist relative longitudinal movement of the inner and outer shells A and B.

The strips 22 and 23 may be of any desired width and length. The strips 22 preferably are relatively narrow and somewhat shorter than the length of the side wall spaces, as shown in the drawing. The strips 23 are secured to the lower barrel head 11, may be four in number, and may be distributed in the space between the lower barrel head 11 (see Figure I) and the inner shell end wall 17 as shown in Figures I and IV.

The inner shell flanges 18 and 19 are slidably received in grooves (see Figure I) which are formed on the inner sides of barrel heads 11.

These grooves in the heads 11 are preferably of such depth that the flanges 18 and 19 do not reach the bottoms of the grooves. This will allow the inner shell A to have limited longitudinal movement within the barrel member B, which movement is yieldingly resisted by the strips 22 and 23.

Bung and tapping devices

Where the barrel of this invention is used for holding beer, it is preferably provided with a bung device C for filling the inner shell A and a tapping device D for withdrawing the beer from the shell or vessel A.

The filling bung device C comprises a tube 25, a packing member or gasket ring 26, and a removable, threaded fitting 27. The tube 25 may extend through the side wall of the inner shell and may have a ring-shaped flange 28 welded to the inner surface of the inner shell side wall (see Figure VI). The packing member 26 may closely fit the tube 25 and extend between the inner and outer shells A and B. The packing member 26 may also have a beveled projection or conically shaped extension 29 on its side facing the barrel member B. The packing member 26 is formed of any suitable material, but is preferably made of elastic or yielding rubber. The fitting 27 extends into an opening in the barrel member B and is threaded onto the outer end of the tube 25. The inner end of the fitting 27 has a conically-shaped recess or socket to receive the conically-shaped projection 29 (see Figure VI). As the fitting 27 is threaded into place on the tube 25, the conical socket of fitting 27 engages the conical projection 29 and forces the latter and the packing member 26 to form a liquid tight joint about the tube 25. The opening in the barrel member B which receives the tube 25 may be beveled at its inner end to conform to the base of the conical projection 29 as shown in Figure VI. As an alternative construction, the fitting 27 may be threaded into the barrel member B and have a sliding fit on the tube 25. The usual form of removable conventional plug 30 may be provided to close the tube 25.

The tapping device D may be adapted to conventional equipment for withdrawing beer from barrels. Such equipment may include a tapping pipe or tube (not shown) to extend through the tapping device D and to a point closely adjacent the end wall 17 of the inner shell. The tapping device D comprises a tube 35, a packing member or gasket ring 36, detachable, threaded fittings 37 and 38, and a washer element 39. The tube 35 may be secured to the inner shell member A in the same manner as the tube 25. The packing member 36 is similar to the packing member 26 and has a conical projection 40 which coacts with a conical recess in the fitting 37 in substantially the same way as the fitting 27 and the conical projection 29. The fitting 37 slidably receives the tube 35 and is threaded into the top head 11 of the barrel member B. The fitting or sleeve 38 is slidably disposed on the tube 35 and is threaded into the fitting 37. The gland or fitting 38 maintains the washer 39 in engagement with the tube 35 and an internal shoulder of the fitting 37 to thereby provide a liquid tight joint about the tube 35. The fitting 38 may also be adapted to have a conventional bayonet joint connection with equipment (not shown) for withdrawing the barrel contents.

Cooling

The illustrated keg has communicating top, bottom and side wall spaces for the circulation of cold water or other cooling medium. This cooling medium may be introduced into the lower end wall space defined by the lower barrel head 11, the end wall 17 and the flange 19.

The cooling medium is preferably so introduced into the lower end wall space that the flow will take the form of diverging streams moving in the general directions of openings 50 which are formed in the flange 19.

A suitable means for introducing the cooling medium into the lower end wall space is illustrated at E. This means E comprises a valve device 60, a pipe or tubular member 61, and an outlet connection or elbow 62. The valve device 60 is threaded into one of the staves 10 and may include a conventional ball check valve. The pipe 61 extends through one of the openings 50 and supports the outlet connection 62 in a position below the center of the end wall 17 (see Figure I), so that the outlet connection 62 will be substantially the same distance from each of the openings 50 (see Figure IV). The outlet connection 62 may discharge toward either the inner shell end wall 17 or the adjacent barrel head 11 and may have four radial slots 63 arranged in alignment with the openings 50. This outlet connection 62 will, therefore, so discharge the cooling medium that it will form a diverging flow with streams moving toward each opening 50. The opening 50 through which the pipe 61 extends, may be somewhat enlarged so that it provides an area of outlet for the cooling medium corresponding to that of each of the other openings 50.

Cooling medium within the lower end wall space circulates from the outlet connection 62, between the rubber strips 23, and through openings 50 (see Figures I and IV). The strips 23 are preferably arranged in spaced relation and in such positions as to leave an unobstructed path for flow between the slots 63 and the openings 50 with which they are aligned. The openings 50 may be four in number, of suitable size, and equally spaced to direct four streams of cooling medium into the side wall space. This side wall space is defined by the flanges 18 and 19, the side walls of the inner and outer shells A and B, and the marginal portions of the barrel heads 11. The openings 50 are spaced intermediate the strips 22, that is, each of the openings 50 is aligned with the space between two of the strips 22. The cooling medium issuing from each opening 50 may, therefore, rise in the side wall space and have unobstructed, vertical flow between the strips 22. The cooling medium from the side wall space flows through openings 51 in the flange 18 to the upper end wall space. These openings 51 are preferably similar in number, arrangement, and spacing to the openings 50. The upper end wall space is defined by the upper end walls 11 and 16 and the flange 18. The cooling medium flows from the upper end wall space through a bushing 52 threaded into the upper barrel head 11. A plug 53 may be provided for the bushing 52 when the keg is not being cooled.

The illustrated construction provides for substantially uniform upward flow in the side wall space over substantially the entire outer side wall surface of the inner shell A to cool the same. Circulation of the cooling medium in the end wall spaces secures chilling of substantially the entire area of the inner shell end walls 16 and 17. The result will be uniform and rapid cooling of substantially the entire inner shell A and likewise its entire content.

With the exception of the opening 50, through which the pipe 61 projects, all of the openings 50 and 51 are of substantially the same size. The opening 50 through which the pipe 61 projects is somewhat larger than the other openings 50 to offset the space filled by the pipe 61. The difference in size of opening may correspond to the cross-sectional area of the pipe 61.

The illustrated construction provides a substantially equal distribution of cooling medium through the openings 50 and also through the openings 51. It also provides for flow between any two of the strips 22 which is substantially similar to the flow between any other two of the strips 22. The cooling action, therefore, will be effective over substantially the entire outer surface of the inner shell A and substantially uniform throughout substantially the entire extent of the inner shell annular side wall.

The bushing 52 and the valve device 60 are to be connected by pipes (not shown) or other means to suitable equipment (not shown) for circulating cooling medium to and from the keg. Such equipment may have means (not shown) for controlling and regulating the temperature of the cooling medium being supplied to the keg. The ball check in the valve device 60 avoids spilling of the cooling medium from the keg onto the floor or other keg support when the cooling medium circulating equipment is disconnected from the keg.

The cooling medium in the keg may be withdrawn when desired by manually unseating the ball check in the valve device 60 or by removing the screw plug 70 of the clean-out bushing 71 in the bottom keg head 11. The bushing 71 also permits cleaning and flushing of the keg side wall and end wall spaces with fluid under pressure when such is necessary.

The bases of the gaskets 26 and 36, as well as the strips 22 and 23, may in their free state be somewhat greater in thickness than the space between the assembled inner and outer shells A and B, so that when the keg is assembled and its parts are forced together and in place, the gaskets 26 and 36, as well as the strips 22 and 23, will cushion and protect the inner shell A and the tubes 25 and 35 against shock and damage.

The foregoing is illustrative, and it will be understood that this invention includes all embodiments and modifications coming within the scope of the appended claims.

I claim:

1. A double-walled container comprising an inner metallic shell having side and end walls to enclose and store a liquid, such as beer, to be cooled, an outer shell of heat insulating material and formed of staves and heads assembled into a liquid tight structure entirely enclosing said inner shell, said inner and outer shells being arranged in spaced relation to provide communicating side wall and end wall spaces for a cooling medium to refrigerate the side and both end walls of said inner shell, means for introducing a cooling medium into one of said end wall spaces for cooling the respective inner shell end wall and for directing the cooling medium from said last named end wall space to said side wall space in the form of a plurality of radially directed streams, partition elements arranged in said side wall space and extending longitudinally of the container to direct said streams toward the other end wall space, said partition elements and said streams being so distributed in said side wall space that substantially the entire outer surface of said inner shell side wall is refrigerated, means directing said side wall space streams into said last-named end wall space for refrigerating substantially the entire outer surface of the respective inner shell end wall, and means providing an outlet for the cooling medium in said last-named end wall space.

2. A double-walled container comprising an outer removable wooden barrel member with relatively thick walls and formed of separable staves and heads assembled into a liquid tight structure, an inner metallic barrel member for storing a liquid, such as beer, and spaced from the side and end walls of said outer barrel member to provide space therebetween for the circulation of a cooling liquid, partition means at each end of said inner barrel member, each of said partition means extending between said inner and outer barrel members to form therewith an end chamber for a cooling liquid, each of said partition means being arranged and formed to provide circulation of the cooling medium between the adjacent cooling chamber and the side wall space between said outer and inner barrel members, a refrigerant inlet connection extending through the outer barrel member and communicating with one of said chambers, and a refrigerant outlet connection extending through the outer barrel member and communicating with the other of said chambers.

3. A container as recited in claim 2, wherein the refrigerant inlet is constructed and positioned to provide a plurality of radially directed streams issuing adjacent the center of the corresponding cooling chamber, and the partition means at said chamber has a number of perforations each in alignment with one of said radially directed streams.

4. A container as in claim 2, wherein each partition means is in the form of a ring shaped flange carried by the inner barrel member, extends into a groove formed in the corresponding end wall of the outer barrel member, and is apertured to provide a flow of the cooling liquid therethrough.

5. A double-walled container comprising an inner metallic vessel for storing a liquid to be cooled, an outer casing completely enclosing said inner vessel, said outer casing being formed of wooden staves and wooden heads held in assembled relation by hoops to form a liquid tight structure, means for maintaining the side and end walls of said vessel spaced from said casing staves and heads to provide space for refrigerant along the sides and ends of said vessel, said spacing means including spaced yielding partition strips secured to said staves and interposed between said outer casing and said inner vessel to direct the flow of refrigerant in said side wall space, said spacing means also including an apertured, circular flange carried by each end of said inner vessel and extending into engagement with the adjacent head of said casing, each of said flanges forming a wall of the adjacent end wall space, the apertures in said flanges being aligned with the spaces between said partition strips, means for introducing a refrigerant into one of said end wall spaces and distributing the refrigerant in the form of a plurality of streams each directed toward an aperture of the adjacent flange, and means providing an outlet for the cooling medium in the other of said end wall spaces.

WILLIAM T. GILES.